US012768797B2

(12) United States Patent
Hildenbrand et al.

(10) Patent No.: US 12,768,797 B2
(45) Date of Patent: Oct. 20, 2026

(54) DETECTION OF AIR BUBBLES IN OPTICAL DETECTION UNIT

(71) Applicant: Roche Diagnostics Operations, Inc., Indianapolis, IN (US)

(72) Inventors: Juergen Hildenbrand, Hünenberg (CH); Alexander Kramlich, Küssnacht am Rigi (CH); Michael Lambertson, Mannheim (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 161 days.

(21) Appl. No.: 18/755,464

(22) Filed: Jun. 26, 2024

(65) Prior Publication Data

US 2024/0426765 A1 Dec. 26, 2024

(30) Foreign Application Priority Data

Jun. 26, 2023 (EP) .................................... 23181338
Aug. 9, 2023 (EP) .................................... 23190576

(51) Int. Cl.
*G01N 21/94* (2006.01)

(52) U.S. Cl.
CPC ... *G01N 21/94* (2013.01); *G01N 2201/12723* (2013.01)

(58) Field of Classification Search
CPC ......... G01N 21/94; G01N 2201/12723; G01N 21/15; G01N 21/31; G01N 21/27; G01N 21/01; G01N 29/02; G01N 2291/022
See application file for complete search history.

(56) References Cited

U.S. PATENT DOCUMENTS 3,972,614 A 8/1976 Johansen et al.
2007/0166195 A1 * 7/2007 Padmanabhan ........ G01N 21/53 422/68.1

(Continued)

FOREIGN PATENT DOCUMENTS

EP 4484924 A1 1/2025

OTHER PUBLICATIONS

Extended European Search Report; European Patent Office; European Patent Application No. 23190576.1; Feb. 6, 2024; 8 pages.

*Primary Examiner* — Jennifer D Bennett
(74) *Attorney, Agent, or Firm* — Taft Stettinius & Hollister LLP

(57) ABSTRACT

An in-vitro diagnostic analyzer includes an optical detection unit comprising a cuvette for optical measurement of a biological sample, a piezo actuator arranged on one side of the cuvette configured to transmit ultrasonic waves through the cuvette, a piezo receiver arranged on the opposite side of the cuvette configured to receive ultrasonic waves transmitted through the cuvette, and a controller that operates according to a lysis operating mode and/or an air-detection operating mode. In the lysis operating mode, the piezo actuator transmits ultrasonic waves through the cuvette for disrupting cellular particles contained in the biological sample. In the air-detection operating mode, the piezo actuator transmits ultrasonic waves through the cuvette and the controller correlates changes in amplitude and/or shifts of phase of the ultrasonic waves received by the piezo receiver relative to reference values with an eventual presence and quantity of air in the cuvette.

11 Claims, 6 Drawing Sheets

(56) References Cited

U.S. PATENT DOCUMENTS

| | | | | |
|---|---|---|---|---|
| 2010/0151512 | A1* | 6/2010 | Huemer | G01N 33/4925 435/40.5 |
| 2013/0114068 | A1 | 5/2013 | Lim et al. | |
| 2018/0110913 | A1* | 4/2018 | Loderer | G01F 1/74 |
| 2025/0319466 | A1* | 10/2025 | Jasperse | B01L 3/502715 |

* cited by examiner

DETECTION OF AIR BUBBLES IN OPTICAL DETECTION UNIT

CROSS-REFERENCE TO RELATED APPLICATIONS

This application claims priority to European Patent Application No. 23181338.7 filed on Jun. 26, 2023 and European Application No. 23190576.1 filed on Aug. 9, 2023, the contents of each application are incorporated herein by reference in their entireties.

FIELD OF THE INVENTION

The present invention refers to an in-vitro diagnostic analyzer comprising an optical detection unit and configured to determine the presence of air bubbles interfering with the optical measurement and to a an automated method of operating the in-vitro diagnostic analyzer in order to determine if the optical measurement of the biological sample is affected by the presence of air.

BACKGROUND

In medicine, doctor's diagnosis and patient treatment often relies on the measurement of patient sample parameters carried out by in-vitro diagnostic analyzers. It is important that the analyzers perform correctly by providing precise and reliable measurements. Thus, it is a general requirement for in-vitro diagnostic analyzers to implement workflows that ensure analytical performance.

Some in-vitro diagnostic analyzers comprise a fluidic system, comprising detection units, including e.g. optical detection units, comprising e.g. a flow-through cuvette for the optical measurement of a biological sample introduced therein. The analytical workflow typically includes the use of additional fluids, besides samples, which are sequentially introduced in the fluidic system.

Examples of sample parameters that can be determined by optical measurement of a biological sample such as blood include hemoglobin (Hb) and hemoglobin derivatives. In turn, additional sample parameters can be deduced based on the previous measurements such as Oxygen saturation ($SO_2$) and total Hemoglobin (tHb=sum of all Hemoglobins). In order to perform these measurements the blood sample in the cuvette is typically lysed (hemolyzed) by disruption of cellular particles, including erythrocytes containing the hemoglobin, thereby minimizing light scattering otherwise caused by cells.

Some analyzers may comprise a piezo actuator basically consisting of a piezo-ceramics-driven piston, vibrating typically at a frequency of 40-50 kHz, arranged on one side of the cuvette configured to transmit ultrasonic waves through the cuvette. In this process the membranes of the erythrocytes are disrupted through cavitation and the hemoglobin is released.

A problem often encountered with this fluidic setup is that air bubbles of various sizes may occur in the cuvette that can interfere with the optical measurement. In particular, the air bubbles, besides reducing the volume of sample in the optical path, may also cause light scattering and may reduce the lysis performance due to air compression. Moreover the oxygen content in the air bubbles can change the real oxygen content in the sample being measured.

GENERAL DESCRIPTION

It is against the above background that aspects of the present disclosure provide certain unobvious advantages and advancements over the prior art. In particular, a new in-vitro diagnostic analyzer (IVD) comprising an optical detection unit comprising a cuvette is herein disclosed that with minor hardware and software modifications with respect to known analyzers enables to achieve both efficient lysis of a biological sample in the cuvette as well as to determine if there is air in the cuvette affecting the optical measurement of the sample.

A respective automated method and presenting the same advantages is herein also disclosed.

In particular, the IVD analyzer of the present disclosure comprises an optical detection unit comprising a cuvette for the optical measurement of a biological sample contained therein, a piezo actuator arranged on one side of the cuvette configured to transmit ultrasonic waves through the cuvette, a piezo receiver arranged on the opposite side of the cuvette configured to receive ultrasonic waves transmitted through the cuvette and a controller configured to operate according to either a lysis operating mode or an air-detection operating mode. According to the lysis operating mode the piezo actuator is configured to transmit ultrasonic waves through the cuvette for disrupting cellular particles contained in the biological sample. According to the air-detection operating mode the piezo actuator is configured to transmit ultrasonic waves through the cuvette and the controller is configured to correlate changes in amplitude and/or shifts of phase of the ultrasonic waves received by the piezo receiver relative to reference values with an eventual presence and quantity of air in the cuvette, in order to determine if the optical measurement of the biological sample is affected by the presence of air.

The term "in-vitro diagnostic analyzer" or "IVD analyzer" as used herein refers to an automated or semi-automated analytical apparatus configured to analyze samples in vitro in order to provide information for screening, diagnosis or treatment monitoring purposes. The IVD analyzer can be designed and configured according to the medical area of application, the parameters to be determined and corresponding laboratory workflows. For example, in a point-of-care testing environment, IVD analyzers can vary from handheld devices with low throughput, short turn-around time and limited number of measurable parameters to compact benchtop instruments with higher throughput and higher number of measureable parameters. Such IVD analyzers are designed to detect certain types of parameters, e.g. gases, electrolytes, metabolites, clinical chemistry analytes, immunochemistry analytes, coagulation parameters, hematology parameters, etc. Depending on the parameters of interest, a variety of different analytical methods and different detection technologies can be applied. For example, in the field of blood gas and electrolyte testing, electrochemical measuring principles and/or conductivity measuring principles and/or optical detection methods are typically used. An IVD analyzer typically comprises a plurality of functional units, each dedicated to a specific task and cooperating with each other in order to enable automated sample processing and analysis. Such functional units may include e.g. a sample input interface for receiving a sample, a fluidic system, an analytical measurement unit or detection unit, a fluid-supply unit, and the like. One or more functional units may be integrated into a larger unit or module in order to simplify the operation of the IVD analyzer.

In particular, the IVD analyzer of the present disclosure comprises at least an optical detection unit comprising a cuvette arranged between a light source and a photodetector, typically a spectrophotometer, for the optical measurement of a biological sample contained therein. A "cuvette" is a container or chamber typically comprising two parallel straight and clear walls at a predetermined distance from each other at least in correspondence of the optical path between the light source and the detector, enabling measuring the intensity of light in a part of the spectrum, that is transmitted or emitted by particular substances present in a sample placed therein. The optical detection unit may be embodied as a flow-through optical detection unit comprising a flow-through cuvette or flow-through optical path enabling fluids such as samples and possibly other fluids to flow in and out.

The IVD analyzer may further comprise an additional detection unit comprising a "flow-through sensor path" that is a fluidic conduit comprising one or more sensors that a sample flowing through the sensor path comes in contact with, e.g. arranged sequentially along the path, e.g. a sensor for each different parameter/analyte to be detected, and may be embodied in a replaceable cartridge-like structure comprising a plurality of sensors, possibly distributed across a plurality of sensor paths. In alternative, the IVD analyzer may comprise a plurality of detection units, each having a sensor path comprising a sensor dedicated to one parameter/analyte, and which may also be replaceable or not. A sample may thus flow into the one or more sensor paths and different parameters/analytes may be determined by respective sensors. The term "sensor" is herein generically used to indicate a detector configured to detect sample parameters by generating a correlated signal output that can be quantified and digitized. The sensor can be e.g. a biosensor, a chemical sensor or a physical sensor and is typically a part of a functional unit of an IVD analyzer, e.g. an analytical measurement unit or detection unit. The sensor can be selective or specific with respect to one sample parameter of interest or can be configured to detect and quantify a plurality of different sample parameters of interest. Depending on the type of sensor, a sensor can comprise a plurality of sensory elements. The term "sensory element" therefore refers to a part of a sensor (e.g. to a working electrode, a reference electrode, a counter electrode) that in combination with one or more other sensory elements forms a fully functional sensor. According to an embodiment, the flow-through sensor path comprises any one or more of a $pO_2$ sensor, a $pCO_2$ sensor, a pH sensor, one or more ion selective electrode (ISE) sensors for determining electrolyte values such $Na^+$, $K^+$, $Ca_2^+$ and $Cl^-$, one or more metabolite sensors for determining parameters such as lactate and glucose. The sensors may be e.g. respectively based on the amperometric, potentiometric or conductometric principle.

The IVD analyzer may further comprise at least one pump, e.g. a peristaltic pump, syringe pump, membrane pump or any other suitable pump, for transporting e.g. samples from sample containers, wash fluid and possibly other fluids from a fluid-supply unit, or ambient air through the detection unit(s).

In particular, the IVD analyzer of the present disclosure comprises a piezo actuator arranged on one side of the cuvette configured to transmit ultrasonic waves through the cuvette and a piezo receiver arranged on the opposite side of the cuvette configured to receive ultrasonic waves transmitted by the piezo actuator though the cuvette. Ultrasonic waves are sound waves created by vibrations. These vibrations create areas of more and less densely packed particles, when travelling in a medium such as air, liquid or solid. Sound waves travel faster in denser substances because neighboring particles more easily bump into one another. Thus sound waves travel much faster in a liquid than they do in air. In freshwater at room temperature, for example, sound travels about 4.3 times faster than it does in air at the same temperature.

The term "piezo actuator" is herein used to indicate a generator of ultrasonic waves by use of a piezoelectric crystal, typically embodied as a film or thin layer of multiple, tiny, interlocking crystal domains that have positive and negative charges. By applying a voltage the crystal can undergo expansion or contraction. In particular, by applying a modulated voltage a vibration of the crystal can be obtained.

Depending on the design, e.g. material, shape, thickness and vibration mode, e.g. radial mode or thickness mode, the crystal can vibrate in different frequency ranges and have different resonance frequencies.

A piezoelectric crystal can also operate in the opposite way, that is when compressive or tensile mechanical stress is applied to the elements, the crystal generates a proportional voltage and its signal can be used to measure vibration, strain and pressure for example, thus operating as a sensor or detector.

The term "piezo receiver" is herein used to indicate a piezoelectric crystal, that can be structurally similar or even identical to that of the piezo actuator, but that is used as a detector of ultrasonic waves transmitted by the piezo actuator though the cuvette, that is by measuring the voltage generated as a result of the vibration induced on the piezo receiver by the transmitted ultrasonic waves. In particular, by measuring the voltage generated it is possible to determine the wave energy and hence the wave amplitude. This is because wave's energy and wave's amplitude are closely related to each other. The relation between the energy of the wave and the amplitude of the wave is given by the formula $E \propto A^2$ where E denotes the wave's energy, and A denotes the wave's amplitude. We can see that the wave's energy is directly proportional to the square of the amplitude of the wave. Thus, if there is a slight change in energy, it results in a squared change in amplitude. When a wave propagates from one medium to another, a part of the wave goes through the new medium and the remaining part is reflected back. Thus changing media causes a decrease in energy, that directly leads towards a change and more precisely a reduction of amplitude.

When a sound wave passes from a liquid, such as a sample contained in the cuvette, into air, eventually also present in the cuvette, a change and in particular a decrease or attenuation of wave amplitude can be observed when compared to the same wave travelling only through the sample filling the cuvette in absence of air bubbles. In particular, it is possible to correlate changes in received wave amplitudes relative to reference values (obtained under the same conditions with the sample filling the cuvette in absence of air bubbles) with the presence and quantity of air in the cuvette, in order to determine if the optical measurement of the biological sample is affected by the presence of air.

Typically, when a wave passes from a medium, e.g. a liquid medium like a sample, into another medium such as air, also a shift of wave phase relative to reference wave phases (observed under the same conditions with the sample filling the cuvette in absence of air bubbles) can be observed and can thus be correlated with the presence and quantity of air in the cuvette.

In general, a change and more specifically attenuations/reductions of wave amplitude and/or shifts of wave phase can be possibly correlated also to different statuses of the sample such as to different levels of hematocrit and/or to lysed or non-lysed sample status and/or to the presence of clots.

According to an embodiment, the piezo actuator and the piezo receiver are ring shaped such as to form an optical window in the middle of the ring for the optical measurement of the biological sample through the cuvette.

The term "sample" refers to a biological material potentially containing one or more analytes of interest and whose detection or analysis, qualitative and/or quantitative measurement, may be associated to a clinical condition. The sample can be derived from any biological source, such as a physiological fluid, including blood, saliva, ocular lens fluid, cerebral spinal fluid, sweat, urine, milk, ascites fluid, mucous, synovial fluid, peritoneal fluid, amniotic fluid, tissue, cells or the like. The test sample can be pretreated prior to use, such as preparing plasma or serum from blood, diluting viscous fluids, lysis or the like; methods of treatment can involve filtration, centrifugation, distillation, concentration, inactivation of interfering components, and the addition of reagents. A sample may be used directly as obtained from the source in some cases or following a pretreatment and/or sample preparation workflow to modify the character of the sample, e.g. after adding an internal standard, after being diluted with another solution or after having being mixed with reagents e.g. to enable carrying out one or more in vitro diagnostic tests, or for enriching (extracting/separating/concentrating) analytes of interest and/or for removing matrix components potentially interfering with the detection of the analyte(s) of interest.

According to one aspect, the sample is blood or a blood derivative such as plasma or serum.

According to certain aspects, analytes of interest are hemoglobin, hemoglobin derivatives such as deoxygenated Hemoglobin (HHb), Oxyemoglobin ($O_2$Hb), Carboxyhemoglobin (COHb), Methemoglobin (MetHb), bilirubin, Urea, Creatinine, typically measured in the optical detection unit. In turn, additional sample parameters can be deduced based on the previous measurements such as Oxygen saturation ($SO_2=O_2Hb/(O_2Hb+HHb)$) and total Hemoglobin (tHb=sum of all Hemoglobins). Other analytes of interest are gases, such as $O_2$ and $CO_2$, blood electrolytes such as Sodium ($Na^+$), Potassium ($K^+$), Chloride ($Cl^-$), Calcium ($Ca^{++}$), protons ($H^+$) in relation to pH, metabolites such as Glucose and Lactate, and the like, typically measured in a flow-through sensor path. The list is however not exhaustive.

Samples are typically entered into the fluidic system via a sample input interface, different from the fluid-supply unit, that is another module or component of an in-vitro diagnostic analyzer typically arranged at a position conveniently accessible by an operator and configured to transfer a sample from a sample container, brought up by the operator, into the in-vitro diagnostic analyzer. The sample input interface may e.g. comprise a sample input port comprising an outer input-port side configured for coupling, attaching, connecting, sitting, introducing or plugging-in a sample container, e.g. of the capillary-type or syringe-type, and an inner input-port side coupled to or for coupling to one end of a sample-input conduit, the sample input conduit being fluidically connected or connectable to the detection unit(s).

The term "controller" as used herein may include any physical or virtual processing device and in particular a programmable logic controller running a computer-readable program provided with instructions to perform operations in accordance with an operation plan and in particular in accordance with the method of operating the IVD analyzer in order to determine if the optical measurement of the biological sample is affected by the presence of air, as herein disclosed. This may include a processor, a controller, a central processing unit (CPU), a microprocessor, a microcontroller, a reduced instruction circuit (RISC), an application-specific integrated circuit (ASIC), a logic circuit, or any other circuit or processor configured to execute one or more of the functions/methods described herein. In particular, the controller, among other possible configurations and functions, is configured to correlate changes in amplitude and/or shifts of phase of the ultrasonic waves received by the piezo receiver relative to reference values with an eventual presence and quantity of air in the cuvette, in order to determine if the optical measurement of the biological sample is affected by the presence of air.

In particular, the controller is configured to operate according to either a lysis operating mode or an air-detection operating mode. The term "either" is herein used to indicate that the controller is configured to operate according to both the lysis operation mode and the air-detection operating mode, typically one at a time, although in principle the controller may be configured to operate according to both the lysis operation mode and the air-detection operating mode simultaneously.

A "lysis operation mode" is a mode in which the piezo actuator has the function of transmitting ultrasonic waves through the cuvette in order to disrupt (lyse) cellular particles contained in the biological sample, whereas the piezo receiver is not having any particular function in the lysis operation mode. In this process the membranes of cells contained in the sample, e.g. erythrocytes, are disrupted through cavitation and their content, e.g. hemoglobin, is released.

An "air-detection operating mode" is a mode in which the piezo actuator and the piezo receiver cooperate with each other in order to determine if the optical measurement of the biological sample is affected by the presence of air, thereby exercising jointly a completely different function with respect to the lysis operation mode.

Also, the ultrasonic waves transmitted by the piezo actuator according to the air-detection operating mode may have different amplitude and/or frequency with respect to the ultrasonic waves transmitted according to the lysis operating mode.

According to an embodiment, the amplitude is greater than about 200 V, e.g. about 400-500 V or more according to the lysis operating mode and smaller than about 50 V, e.g. about 10-20 V according to the air-detection operating mode. This is because in order to obtain lysis a higher vibration energy is typically required, whereas in order to detect the presence of air a much lower energy is sufficient.

According to an embodiment, the frequency is smaller than about 60 KHz, e.g. about 40-50 KHz according to the lysis operating mode and greater than about 60 KHz, e.g. about 90-200 KHz according to the air-detection operating mode. In particular, by increasing the frequency and thereby reducing the wavelength of the transmitted ultrasonic wave (the wavelength being inversely proportional to the frequency according to the formula $\lambda=v/f$ where v is the velocity, $\lambda$ is the wavelength and f the frequency), the sensitivity to smaller objects such as smaller air bubbles can be increased, given a certain cuvette thickness, i.e. the distance between the cuvette walls, typically in the range of up to a few millimeters.

According to an embodiment, according to the air-detection operating mode, the controller is configured to scan a predetermined resonance frequency range and to correlate changes in a received wave amplitude spectrum relative to reference wave amplitude spectra and/or a shift of a wave phase profile relative to reference wave phase profiles with the presence and quantity of air in the cuvette. In particular, whereas in the lysis operating mode it may be advantageous to set a fixed frequency at or near to the resonance frequency of the piezo actuator in order to maximize the vibrational energy and efficiency, in the air-detection mode it may be advantageous, due to variable conditions, possibly including different air bubble sizes, variable ambient temperature and the like, to sweep the vibrational frequency in a frequency range in order to collect more data and detect changes over a broader spectrum, e.g. by analyzing amplitude spectra and/or wave phase profiles rather than single values.

According to an embodiment, the controller is configured to operate the IVD analyzer according to the air-detection operating mode before and after operation according to the lysis operating mode in order to additionally determine, by comparison, a lysis result obtained during the lysis operating mode.

The present disclosure also refers to an automated method of operating an IVD analyzer comprising an optical detection unit comprising a cuvette for the optical measurement of a biological sample contained therein, a piezo actuator arranged on one side of the cuvette configured to transmit ultrasonic waves through the cuvette, a piezo receiver arranged on the opposite side of the cuvette configured to receive ultrasonic waves transmitted through the cuvette and a controller configured to operate according to either a lysis operating mode or an air-detection operating mode. According to the lysis operating mode the method comprises transmitting ultrasonic waves through the cuvette by the piezo actuator for disrupting cellular particles contained in the biological sample, and wherein according to the air-detection operating mode the method comprises transmitting ultrasonic waves through the cuvette by the piezo actuator and correlating changes in amplitude and/or shifts of phase of the ultrasonic waves received by the piezo receiver relative to reference values with an eventual presence and quantity of air in the cuvette, in order to determine if the optical measurement of the biological sample is affected by the presence of air.

According to an embodiment, the method comprises having the piezo actuator and the piezo receiver ring shaped such as to form an optical window in the middle of the ring for the optical measurement of the biological sample through the cuvette.

According to an embodiment, the method comprises transmitting the ultrasonic waves according to the air-detection operating mode with different amplitude and/or frequency with respect to the ultrasonic waves transmitted according to the lysis operating mode.

According to an embodiment, the amplitude is greater than about 200 V, e.g. about 400-500 V or more according to the lysis operating mode and smaller than about 50 V, e.g. about 10-20 V according to the air-detection operating mode.

According to an embodiment, the frequency is smaller than about 60 KHz, e.g. about 40-50 KHz according to the lysis operating mode and greater than about 60 KHz, e.g. about 90-200 KHz according to the air-detection operating mode.

According to an embodiment, according to the air-detection operating mode, the method comprises scanning a predetermined resonance frequency range and correlating changes in a received wave amplitude relative to reference wave amplitude spectra and/or a shift of a wave phase profile relative to reference wave phase profiles with the presence and quantity of air in the cuvette.

According to an embodiment, the method comprises performing the optical measurement of the biological sample if it is determined that the optical measurement is unaffected by the presence of air.

According to an embodiment, the method comprises operating the IVD analyzer according to the air-detection operating mode before and after operating the IVD analyzer according to the lysis operating mode in order to additionally determine by comparison a lysis result obtained during the lysis operating mode.

Other and further objects, features and advantages will appear from the following description of exemplary aspects and accompanying drawings, which serve to explain the principles more in detail.

Skilled artisans appreciate that elements in the figures are illustrated for simplicity and clarity and have not necessarily been drawn to scale. For example, the dimensions of some of the elements in the figures may be exaggerated relative to other elements whereas other elements may have been left out or represented in a reduced number in order to enhance clarity and improve understanding of the aspects of the present disclosure.

DETAILED DESCRIPTION

Figure 1:
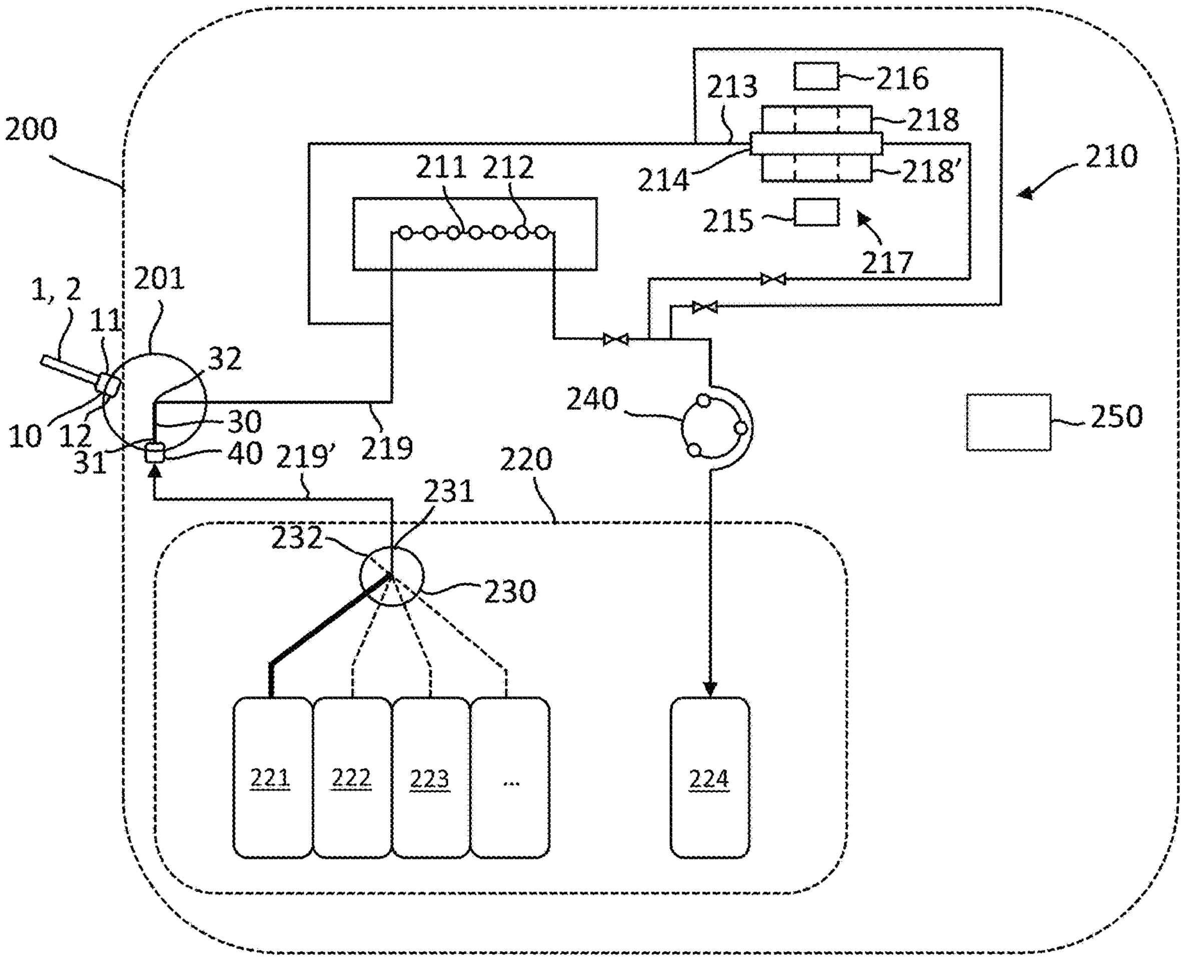
FIG. 1 shows schematically an IVD analyzer comprising an optical detection unit and a controller configured to operate according to either a lysis operating mode or an air-detection operating mode.

FIG. 1 shows schematically an IVD analyzer 200 comprising a fluidic system 210 comprising different fluidic paths 211, 213. The fluidic path 211 is a flow-through sensor path comprising a plurality of sensors 212. The fluidic path 213 is a flow-through optical path comprising a cuvette 214 arranged between a light source 215 and a photodetector 216, thereby forming an optical detection unit 217 for the optical measurement of a biological sample brought into the cuvette 214 via the fluidic path 213.

The IVD analyzer 200 further comprises a pump 240, such as a peristaltic pump, located downstream of the of the fluidic system 210, and a fluid-supply unit 220 comprising a plurality of fluids 221, 222, 223, and a waste container 224 where fluids circulated through the fluidic system 210 may be disposed of, by the action of the pump 240. The IVD analyzer 200 further comprises a fluid-selection valve 230 for selecting between the fluids 221, 222, 223 and/or air 232.

The IVD analyzer 200 further comprises a sample input interface 201, comprising a sample input port 10 comprising an outer input-port side 11 configured for plugging-in an open end of a sample container 1 and an inner input-port side 12. The sample container 1 is in this example a capillary-like sample container. The sample input interface 201 further comprises an aspiration needle 30 comprising an upstream end 31 and a downstream end 32. The downstream end 32 of the aspiration needle 30 is fluidically connected to the fluidic system 210 via fluidic line 219 whereas the upstream end 31 is configured to alternately couple to the inner input-port side 12 in order to aspirate a sample 2 from the sample container 1 plugged in the outer input-port side 11 and to a fluid-supply unit port 40 fluidically connected to a common outlet port 231 of the fluid-selection valve 230 via a further conduit 219'. The fluidic line 219 may be however directly connected to the outlet port 231 of the fluid-selection valve 230, whereas samples may be introduced via a different fluidic line separately connected to the fluid-selection valve 230, for example.

When looking at FIG. 1 in conjunction to FIG. 2A-2E, the IVD analyzer 200 further comprises a piezo actuator 218 arranged on one side of the cuvette 214 configured to transmit ultrasonic waves 254, 254' through the cuvette 214, a piezo receiver 218' arranged on the opposite side of the cuvette 214 configured to receive ultrasonic waves 255, 255', 255'' transmitted through the cuvette 214 and a controller 250 configured to operate according to either a lysis operating mode (L) or an air-detection operating mode (AD). According to the lysis operating mode (L) the piezo actuator 218 is configured to transmit ultrasonic waves 254' through the cuvette 214 for disrupting cellular particles contained in the biological sample 2. According to the air-detection operating mode (AD) the piezo actuator 218 is configured to transmit ultrasonic waves 254 through the cuvette 214 and the controller 250 is configured to correlate changes in amplitude and/or shifts of phase of the ultrasonic waves 255, 255', 255'' received by the piezo receiver 218' relative to reference values with an eventual presence and quantity of air 3 in the cuvette 214, in order to determine if the optical measurement of the biological sample 2, 2' is affected by the presence of air 3.

Figure 2A:
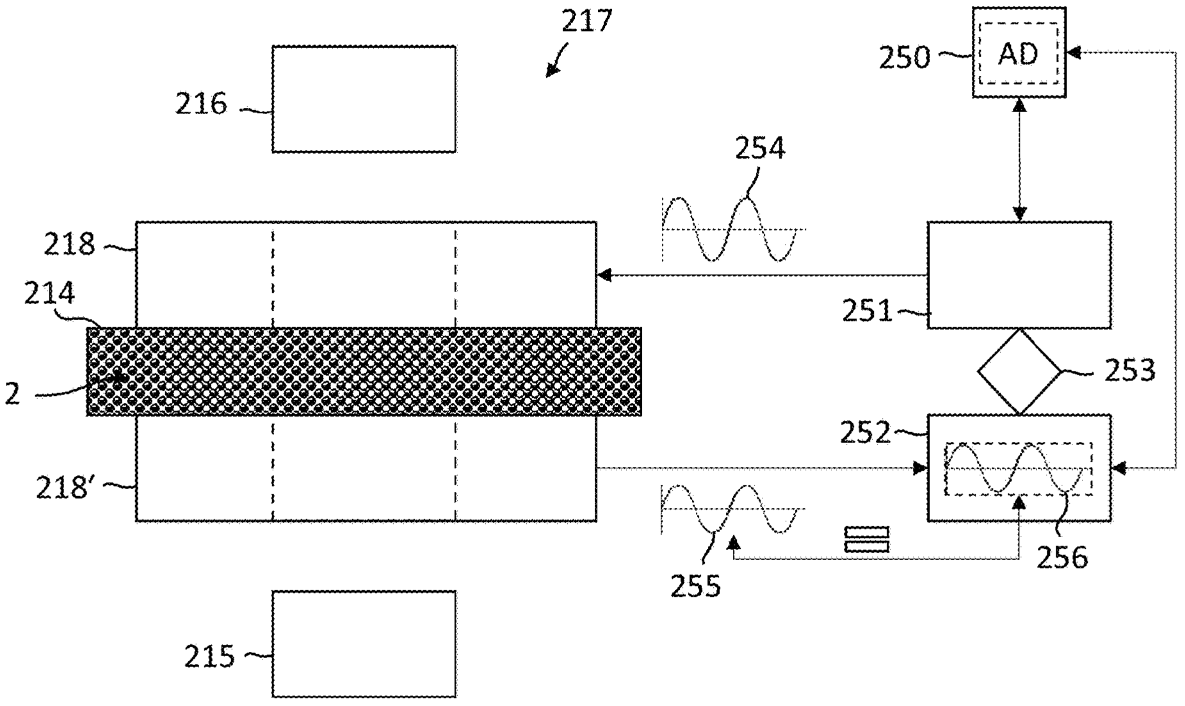
FIG. 2A shows schematically some more details of the optical detection unit and controller of FIG. 1 with the controller operating in air-detection operating mode with a non-lysed sample in absence of air bubbles.

FIG. 2A shows schematically some more details of the optical detection unit 217, partly shown also in FIG. 1, comprising the cuvette 214 arranged between the light source 215 and the photodetector 216, as well as the piezo actuator 218 and the piezo receiver 218' on each respective size of the cuvette 214. In particular, the piezo actuator 218 is electronically connected to actuation control unit 251 and the piezo receiver 218' is electronically connected to receiving control unit 252, both electronically connected to the main control unit 250.

More in particular, FIG. 2A shows schematically the controller 250 operating in the air-detection operating mode (AD) in which the piezo actuator 218 and the piezo receiver 218' cooperate with each other. In particular, the actuation control unit 251 controls the piezo actuator 218 such as to transmit ultrasonic waves 254 through the cuvette 214 with predetermined wave parameters such as predetermined amplitude and frequency whereas the receiving control unit 252 measures the actual parameters, such as actual amplitude, of the ultrasonic waves 255 received by the piezo receiver 218' with respect to those of the ultrasonic waves 254 transmitted by the piezo actuator 218 though the cuvette 214 and with respect to reference values, for the purpose of determining the eventual presence and quantity of air in the cuvette 214. In particular, the actuation control unit 251 and the receiving control unit 252 cooperate with each other by providing transmitted data and received data that are elaborated by a cross-correlation algorithm 253, while taking into account also reference values with respect to the type of optical detection unit 217 and cuvette content, e.g. type of sample, in order to determine the eventual presence and quantity of air in the cuvette 214, possibly affecting the optical measurement of the biological sample. In particular, a change and more specifically attenuations/reductions of wave amplitude and/or shifts of wave phase can be correlated to the quantity of air eventually present in the cuvette 214, and can be possibly correlated also to different statuses of the sample such as to different levels of hematocrit and/or to lysed or non-lysed sample status and/or to the presence of clots. In the schematic example shown in FIG. 2A the sample 2 contained in the cuvette 214 is a non-lysed sample (before lysis) and without the presence of air. The actual amplitude of the received wave 255 is comparable to that of a reference wave 256 under the same conditions in absence of air.

Figure 2B:
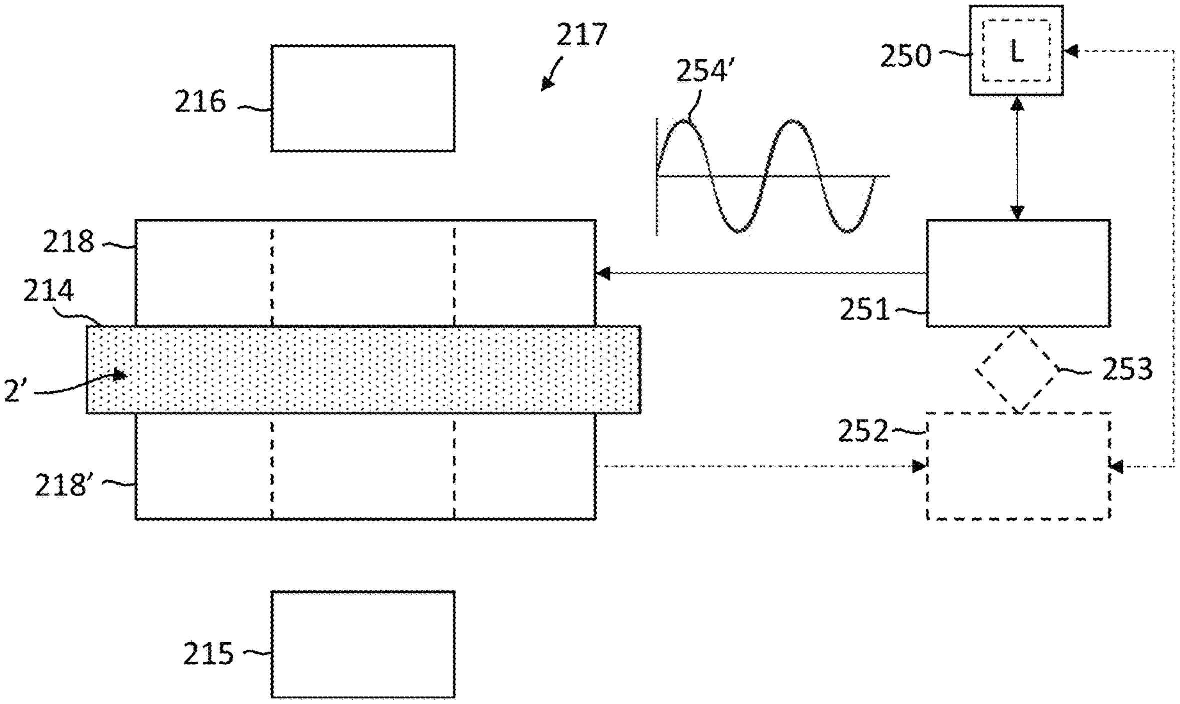
FIG. 2B shows the same optical detection unit of FIG. 2A but with the controller operating in the lysis operating mode.

FIG. 2B shows the same optical detection unit 217 of FIG. 2A but with the controller 250 operating in the lysis operating mode (L). In this case, the piezo actuator 218 has the function of transmitting ultrasonic waves through the cuvette 214 in order to disrupt cellular particles contained in the sample, thereby obtaining a lysed sample 2', represented with a different pattern compared to the non-lysed sample 2 of FIG. 2A. The piezo receiver 218', the receiving control unit 252 and the cross-correlation algorithm 253 are not having any function in the lysis operating mode (L) and are represented with a broken line symbolizing a non-active status. In this process the membranes of cells contained in the sample, e.g. erythrocytes, are disrupted through cavitation and their content, e.g. hemoglobin, is released. Also, the transmitted ultrasonic waves 254' have a greater amplitude with respect to the ultrasonic waves 254 transmitted in the air-detection operating mode of FIG. 2A.

Figure 2C:
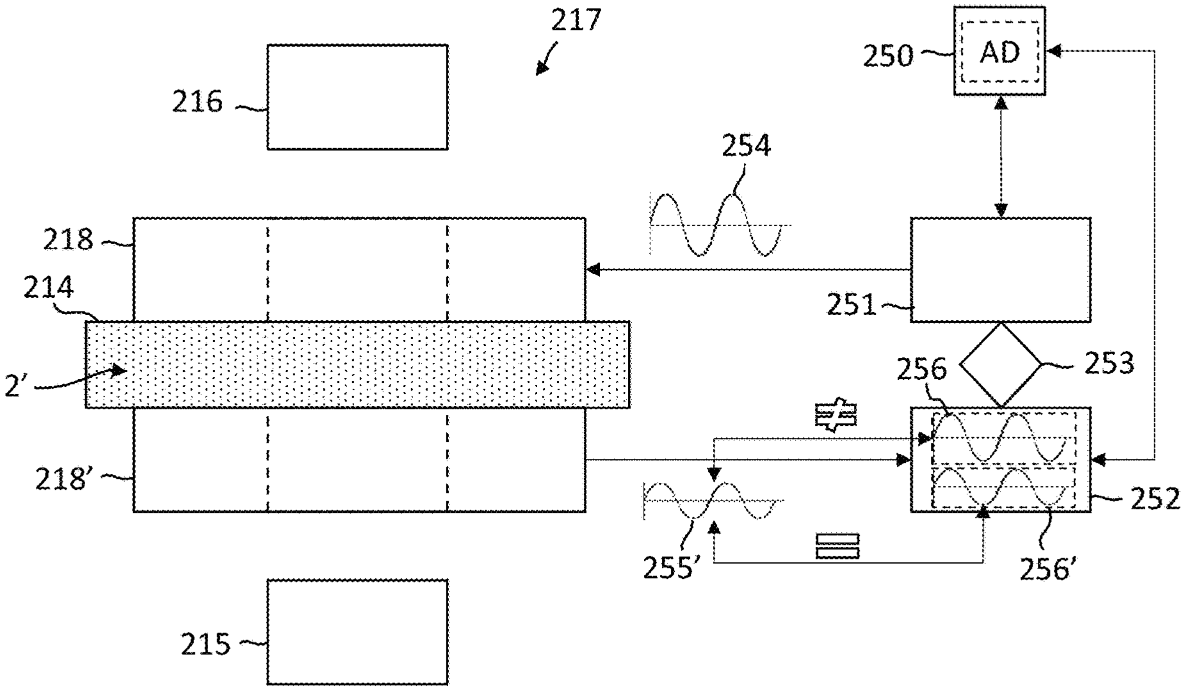
FIG. 2C is similar to FIG. 2A with the controller operating in the air-detection operating mode but with a lysed sample in absence of air bubbles.

FIG. 2C is similar to FIG. 2A with the controller 250 operating in the air-detection operating mode (AD) but with a lysed sample 2' in the cuvette 214 as obtained in the lysis operating mode (L) shown in FIG. 2B and in the absence of air in the cuvette 214. Schematically, a reduction of amplitude of the received ultrasonic waves 255' can be observed compared to that of the transmitted ultrasonic waves 254. Also, the actual amplitude of the received wave 255' is comparable to that of a reference wave 256' under the same conditions in absence of air and slightly different from that of the reference wave 256 relative to a non-lysed sample 2 as shown in FIG. 2A. It is thus possible to distinguish also between lysed sample 2' and non-lysed sample 2 thereby confirming the effect of the lysis operation or lysis result obtained in the lysis operating mode (L).

Figure 2D:
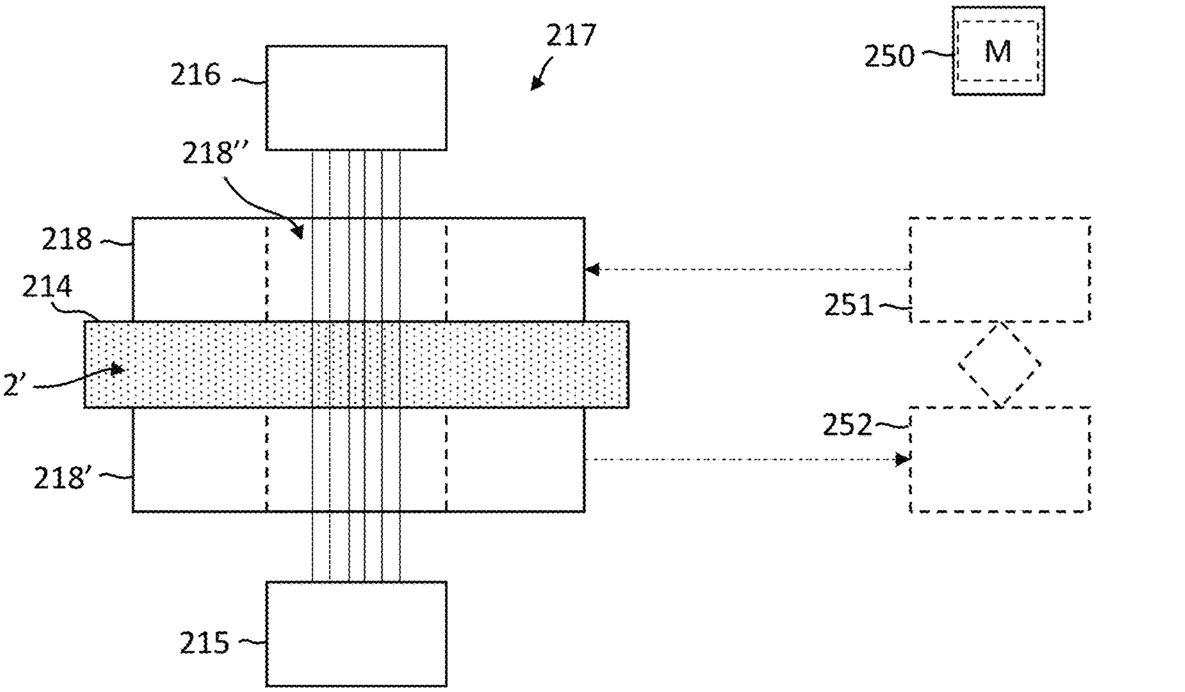
FIG. 2D shows schematically the same optical detection unit of FIG. 2A-2C with the controller in optical measurement mode, after determining the absence of air in the lysed sample.

FIG. 2D shows schematically the same optical detection unit 217 of FIG. 2A-2C with the controller 250 in an optical measurement mode (M), while optical measurement of the biological sample 2' is taking place after determining the absence of air in the lysed sample 2' in the cuvette 214. The piezo actuator 218 and the piezo receiver 218' are ring shaped such as to form an optical window 218" in the middle of the ring for the optical measurement of the biological sample 2' through the cuvette 214. The piezo actuator 218, the piezo receiver 218', the actuation control unit 251 and the receiving control unit 252 do not have any function during optical measurement.

Figure 2E:
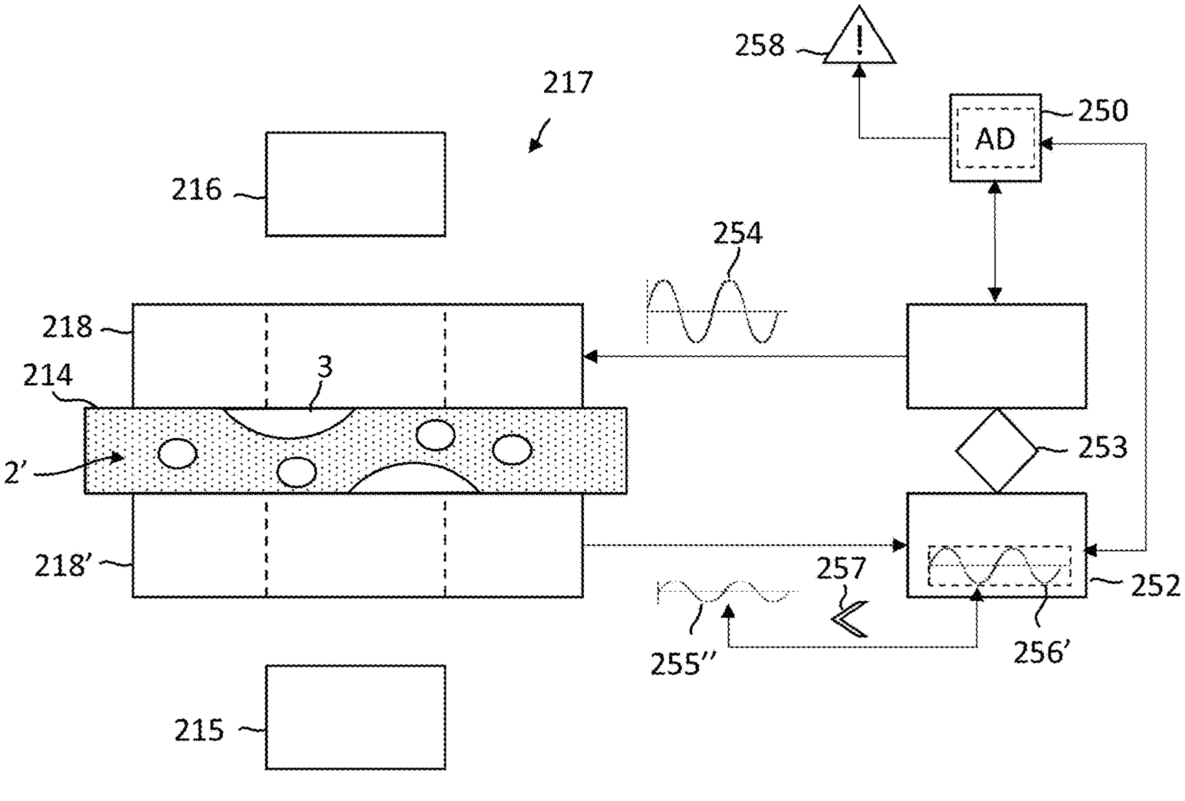
FIG. 2E is similar to FIG. 2C with the controller operating in the air-detection operating mode and with a lysed sample but with the presence of air bubbles.

FIG. 2E is similar to FIG. 2C with the controller 250 operating in the air-detection operating mode (AD) and with a lysed sample 2' in the cuvette 214 but with the presence of air bubbles 3 in the cuvette 214 that would affect the optical measurement of the lysed sample 2'. Schematically, a larger reduction of amplitude of the received ultrasonic waves 255" can be observed compared to that of the transmitted ultrasonic waves 254. Also, the actual amplitude of the received wave 255" is smaller 257 than that of the reference wave 256' under the same conditions in absence of air. By the magnitude of the amplitude reduction it is possible to determine also the quantity of air. The controller 250 can thus determine, as in this case, that the optical measurement of the biological sample is affected by the presence of air, generating for example an alert 258. In that case the controller may terminate the analytical process, e.g. preventing the optical measurement from taking place and starting the process from the beginning with a new sample input. Another option, depending also on the quantity of air being detected, is to nevertheless continue with the optical measurement and to flag the result as possibly faulty or unreliable.

With continued reference to FIG. 2A-2E taken together an automated method of operating an IVD analyzer 200 comprising an optical detection unit 217 comprising a cuvette 214 for the optical measurement of a biological sample 2, 2' contained therein, a piezo actuator 218 arranged on one side of the cuvette 214 configured to transmit ultrasonic waves 254, 254' through the cuvette 214, a piezo receiver 218' arranged on the opposite side of the cuvette 214 configured to receive ultrasonic waves 255, 255', 255" transmitted through the cuvette 214 and a controller 250 configured to operate according to either a lysis operating mode (L) or an air-detection operating mode (AD) is also shown. According to the lysis operating mode (L) the method comprises transmitting ultrasonic waves 254' through the cuvette 214 by the piezo actuator 218 for disrupting cellular particles contained in the biological sample 2, and wherein according to the air-detection operating mode (AD) the method comprises transmitting ultrasonic waves 254 through the cuvette 214 by the piezo actuator 218 and correlating changes in amplitude and/or shifts of phase of the ultrasonic waves 255, 255', 255" received by the piezo receiver 218' relative to reference values with an eventual presence and quantity of air (3) in the cuvette 214, in order to determine if the optical measurement of the biological sample (2, 2') is affected by the presence of air 3.

In this example, the method also comprises having the piezo actuator 218 and the piezo receiver 218' ring shaped such as to form an optical window 218" in the middle of the ring for the optical measurement of the biological sample through the cuvette 214. In this example, the method also comprises transmitting the ultrasonic waves 254 according to the air-detection operating mode (AD) with different amplitude and/or frequency with respect to the ultrasonic waves 254' transmitted according to the lysis operating mode (L). The method further comprises performing the optical measurement of the biological sample 2' if it is determined that the optical measurement is unaffected by the presence of air. The method also comprises operating the IVD analyzer according to the air-detection operating mode (AD) before and after operating the IVD analyzer according to the lysis operating mode (L) in order to additionally determine by comparison a lysis result obtained during the lysis operating mode (L).

Figure 3A:
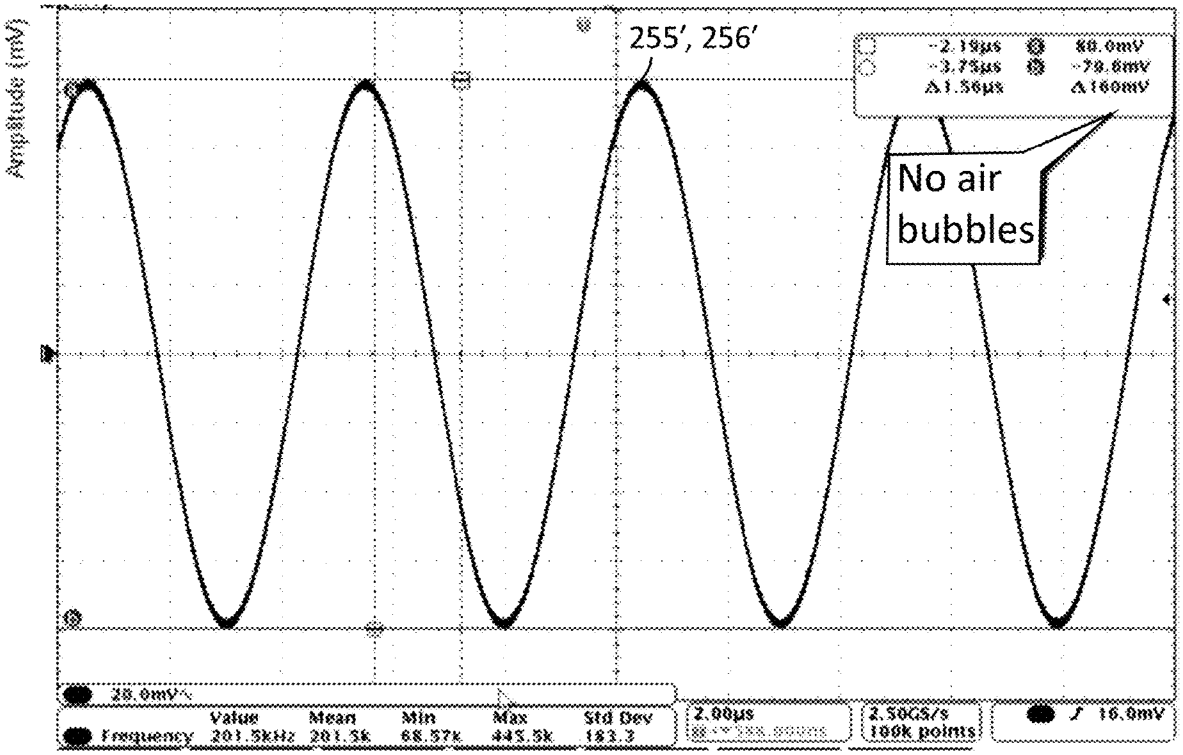
FIG. 3A shows experimental data obtained with lysed blood sample in absence of air bubbles in the air-detection operating mode.
Figure 3B:
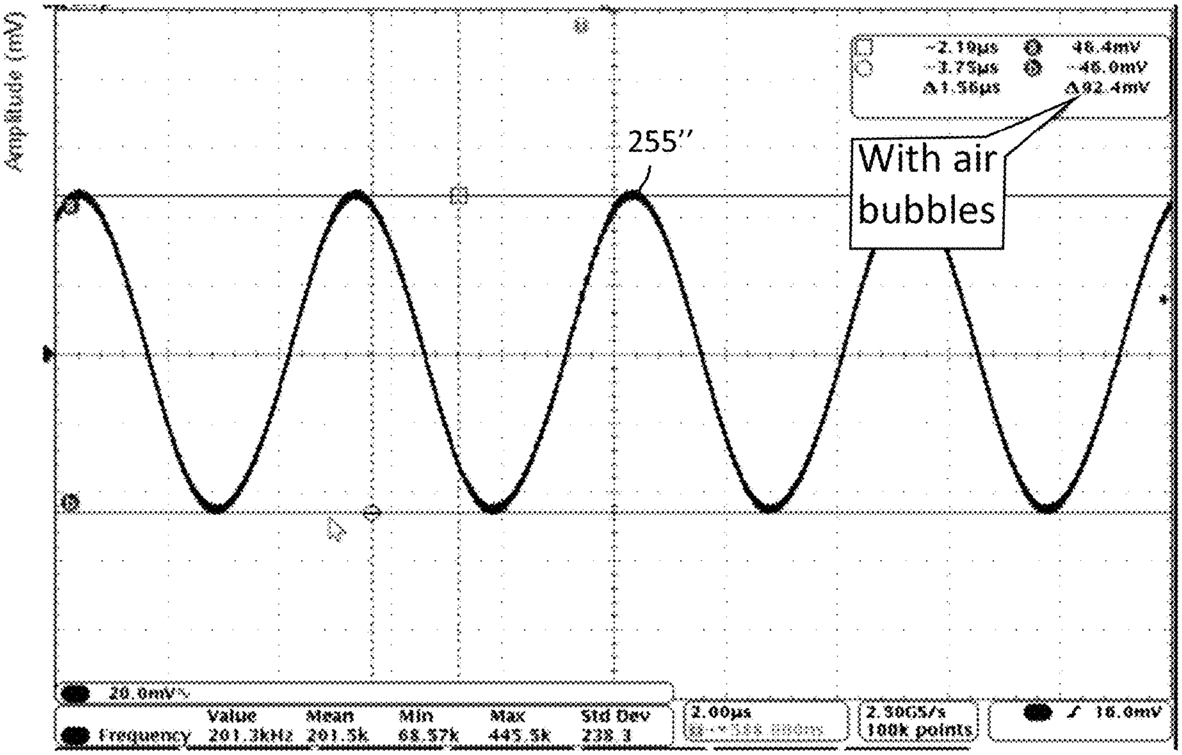
FIG. 3B shows in comparison to FIG. 3A the results obtained in presence of air bubbles, with all other conditions being the same as in FIG. 3A.

FIG. 3A shows experimental data obtained with an arbitrary cuvette filled with a lysed blood sample in absence of air bubbles in the air-detection operating mode. The amplitude of the ultrasonic wave transmitted by the piezo actuator or excitation voltage was set at 12 V peak to peak with a frequency of about 200 KHz. The amplitude of the received ultrasonic wave 255' as measured by the receiving unit via the piezo receiver was about 160 mV peak to peak. FIG. 3B shows in comparison to FIG. 3A the results obtained with the same lysed sample but in presence of air bubbles, with all other conditions being the same as in FIG. 3A. In particular, the transmitted ultrasonic wave had the same amplitude and frequency as in FIG. 3A. The amplitude of the received ultrasonic wave 255" as measured by the receiving unit via the piezo receiver was about 90 mV peak to peak. There is thus an attenuation of about 70 mV peak to peak when compared to the amplitude of the received ultrasonic wave 255' of FIG. 3A obtained under the same conditions but in absence of air and which can be used as reference 256', therefore indicating the presence of air, the larger the attenuation the larger the quantity of air. These values are only exemplary and demonstrative of a measurable change in amplitude that can be correlated to the presence and quantity of air, as they refer to the particular experimental set up, including particular cuvette size and material used, particular piezo actuator and piezo receiver used, particular excitation voltage and frequency applied and can therefore vary under different conditions.

Figure 4:
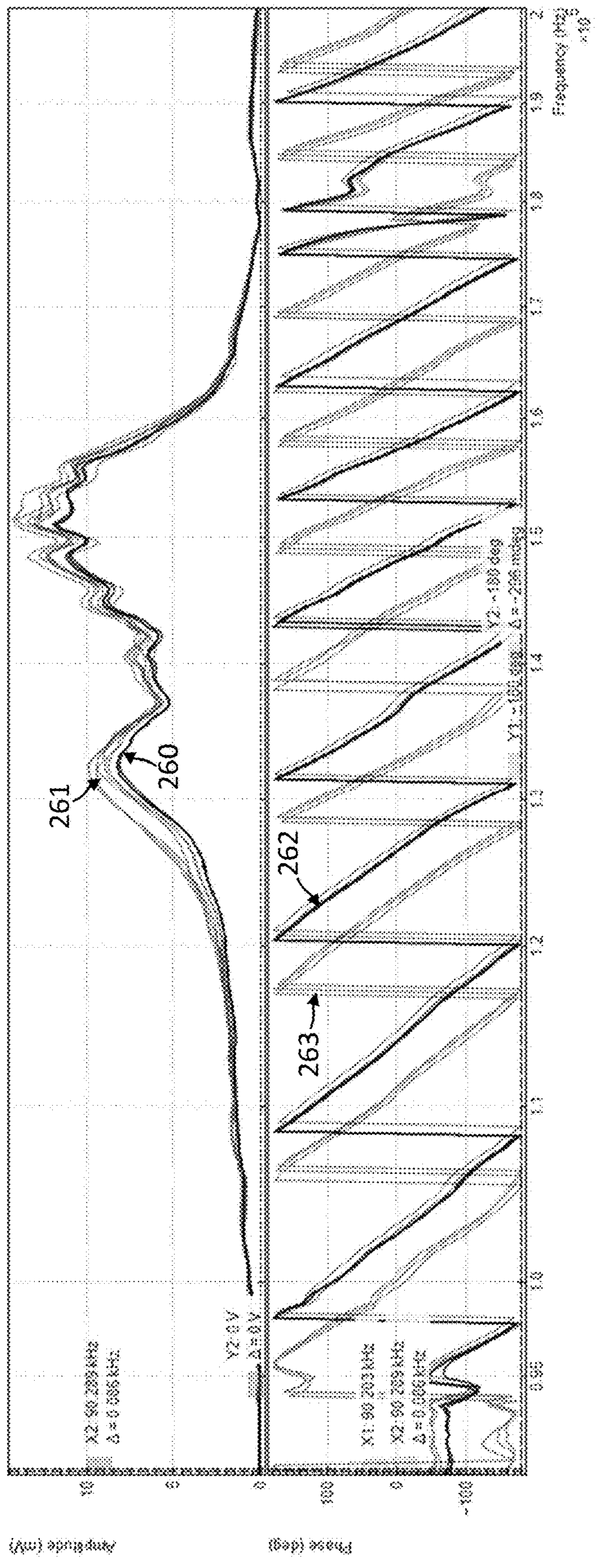
FIG. 4 shows other experimental data obtained with the same experimental set up of FIG. 3A-3B but with the controller configured to scan a predetermined resonance frequency range.

FIG. 4 shows other experimental data obtained with the same experimental set up of FIG. 3A-3B but with the controller configured to scan a predetermined resonance frequency range, 90-200 KHz in this example, and to correlate changes (attenuations) in a received wave amplitude spectrum 260 relative to reference spectra 261 and/or a shift of wave phase 262 relative to reference wave phases 263 with the presence and quantity of air in the cuvette. FIG. 4 also shows another embodiment of the method described above comprising scanning a predetermined resonance frequency range and correlating changes (attenuations) in a received wave amplitude spectrum 260 relative to reference spectra 261 and/or a shift of wave phase 262 relative to reference wave phases 263 with the presence and quantity of air in the cuvette. By sweeping the vibrational frequency in a frequency range more data can be collected and changes can be detected over a broader spectrum, by analyzing amplitude spectra and/or phase profiles rather than single values.

Modifications and variations of the disclosed aspects are also certainly possible in light of the above description. It is therefore to be understood, that within the scope of the appended claims, the invention may be practiced otherwise than as specifically devised in the above examples.

Particularly, it is to be understood that at least some of the drawings or parts are only schematic and provided as way of example only. Also the relationship between elements may be other than the one shown, whereas parts not relevant for the purpose of this disclosure have been omitted.

Also, reference throughout the preceding specification to "one aspect", "an aspect", "one example" or "an example", "one embodiment" or "an embodiment" means that a particular feature, structure or characteristic described in connection with the aspect or example or embodiment is included in at least one aspect, example or embodiment. Thus, appearances of the phrases “in one aspect”, “in one aspect”, “one example” or “an example”, “one embodiment” or “an embodiment”, in various places throughout this specification are not necessarily all referring to the same aspect or example or embodiment.

Furthermore, the particular features, structures, or characteristics may be combined in any suitable combinations and/or sub-combinations in one or more aspects or examples or embodiments.

The invention claimed is:

1. An in-vitro diagnostic (IVD) analyzer comprising an optical detection unit comprising a cuvette for an optical measurement of a biological sample contained therein, the IVD analyzer further comprising a piezo actuator arranged on one side of the cuvette configured to transmit ultrasonic waves through the cuvette, a piezo receiver arranged on the opposite side of the cuvette configured to receive ultrasonic waves transmitted through the cuvette and a controller configured to operate according to either a lysis operating mode or an air-detection operating mode, wherein according to the lysis operating mode the piezo actuator is configured to transmit ultrasonic waves through the cuvette for disrupting cellular particles contained in the biological sample, and wherein according to the air-detection operating mode the piezo actuator is configured to transmit ultrasonic waves through the cuvette and the controller is configured to correlate changes in amplitude and/or shifts of phase of the ultrasonic waves received by the piezo receiver relative to reference values with an eventual presence and quantity of air in the cuvette, in order to determine if the optical measurement of the biological sample is affected by the presence of air, wherein the ultrasonic waves transmitted by the piezo actuator according to the air-detection operating mode have different amplitude and/or frequency with respect to the ultrasonic waves transmitted according to the lysis operating mode, and wherein the amplitude is greater than about 200 V according to the lysis operating mode and smaller than about 50 V according to the air-detection operating mode.

2. The IVD analyzer according to claim 1, wherein the piezo actuator and the piezo receiver are ring shaped such as to form an optical window in the middle of the ring for the optical measurement of the biological sample through the cuvette.

3. The IVD analyzer according to claim 1, wherein the frequency is smaller than about 60 KHz according to the lysis operating mode and greater than about 60 KHz according to the air-detection operating mode.

4. The IVD analyzer according to claim 1, wherein, according to the air-detection operating mode, the controller is configured to scan a predetermined resonance frequency range and to correlate changes in a received wave amplitude spectrum relative to reference wave amplitude spectra and/or a shift of a wave phase profile relative to reference wave phase profiles with the presence and quantity of air in the cuvette.

5. The IVD analyzer according to claim 1, wherein the controller is configured to operate according to the air-detection operating mode before and after operation according to the lysis operating mode in order to additionally determine, by comparison, a lysis result obtained during the lysis operating mode.

6. An automated method of operating an in-vitro diagnostic (IVD) analyzer comprising an optical detection unit comprising a cuvette for an optical measurement of a biological sample contained therein, a piezo actuator arranged on one side of the cuvette configured to transmit ultrasonic waves through the cuvette, a piezo receiver arranged on the opposite side of the cuvette configured to receive ultrasonic waves transmitted through the cuvette and a controller configured to operate according to either a lysis operating mode or an air-detection operating mode, wherein according to the lysis operating mode the method comprises transmitting ultrasonic waves through the cuvette by the piezo actuator for disrupting cellular particles contained in the biological sample, and wherein according to the air-detection operating mode the method comprises transmitting ultrasonic waves through the cuvette by the piezo actuator and correlating changes in amplitude and/or shifts of phase of the ultrasonic waves received by the piezo receiver relative to reference values with an eventual presence and quantity of air in the cuvette, in order to determine if the optical measurement of the biological sample is affected by the presence of air, the method further comprising transmitting the ultrasonic waves according to the air-detection operating mode with different amplitude and/or frequency with respect to the ultrasonic waves transmitted according to the lysis operating mode, wherein the amplitude is greater than about 200 V according to the lysis operating mode and smaller than about 50 V according to the air-detection operating mode.

7. The method according to claim 6, further comprising having the piezo actuator and the piezo receiver ring shaped such as to form an optical window in the middle of the ring for the optical measurement of the biological sample through the cuvette.

8. The method according to claim 6, wherein the frequency is smaller than about 60 KHz according to the lysis operating mode and greater than about 60 KHz according to the air-detection operating mode.

9. The method according to claim 6, wherein, according to the air-detection operating mode, the method comprises scanning a predetermined resonance frequency range and correlating changes in a received wave amplitude spectrum relative to reference wave amplitude spectra and/or a shift of a wave phase profile relative to reference wave phase profiles with the presence and quantity of air in the cuvette.

10. The method according to claim 6, further comprising performing the optical measurement of the biological sample in response to determining that the optical measurement is unaffected by the presence of air.

11. The method according to claim 6, further comprising operating the IVD analyzer according to the air-detection operating mode before and after operating the IVD analyzer according to the lysis operating mode in order to additionally determine by comparison a lysis result obtained during the lysis operating mode.

* * * * *